May 7, 1946.  N. D. COLVIN  2,399,789
DUMP RAKE TOGGLE RELEASE DEVICE
Filed March 15, 1944

INVENTOR.
N. D. COLVIN

ATTORNEYS

Patented May 7, 1946

2,399,789

UNITED STATES PATENT OFFICE 2,399,789

DUMP RAKE TOGGLE RELEASE DEVICE

Nolan D. Colvin, Moline, Ill., assignor to Deere & Company, Moline, Ill., a corporation of Illinois Application March 15, 1944, Serial No. 526,838

3 Claims. (Cl. 56—393)

The present invention relates generally to dump rakes and more particularly to the toggle device for holding the rake teeth in contact with the ground. A device of this type is shown in Patent 1,850,385, granted to Coultas, March 22, 1932, and comprises a pair of pivotally connected toggle links extending between the rake frame and the rake head. The links are adapted to be in aligned locking position when the rake head is in raking position and a holding lever is provided to coact with the toggle links to hold them in locked position during normal operation. A spring device is provided for breaking the toggle lock when the pressure on the holding lever is released, thereby releasing the locking device so that the rake head can readily be swung to dumping position in a manner well-known to those skilled in the art.

The object of the present invention is concerned primarily with the provision of a novel and improved toggle releasing device which is more durable and more positive in operation, and yet which is simple and inexpensive to manufacture. I have found that a device embodying the principles of the present invention is a distinct improvement over the toggle release spring shown and described in the above mentioned patent.

These and other objects and advantages of my invention will be apparent to those skilled in the art after a consideration of the following description, in which reference is had to the drawing appended hereto, in which Figure 1 is a fragmentary plan view of a portion of a dump rake frame and head showing a toggle holding mechanism equipped with a spring release device embodying the principles of the present invention.

Figure 2:
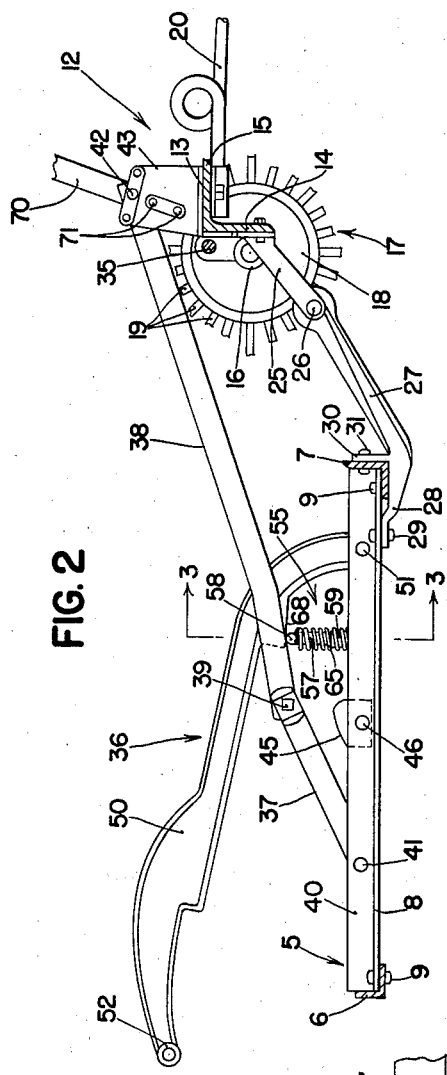
Figure 2 is a side elevational view.
Figure 1:
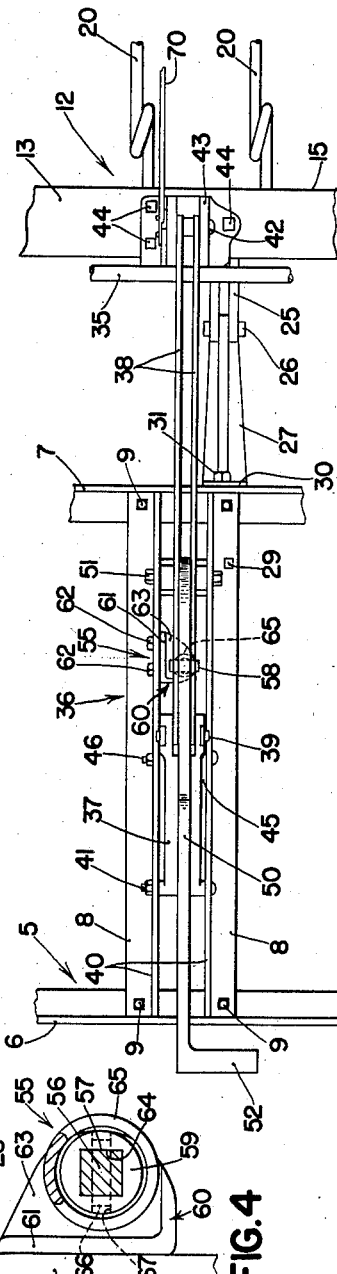
Figure 3:
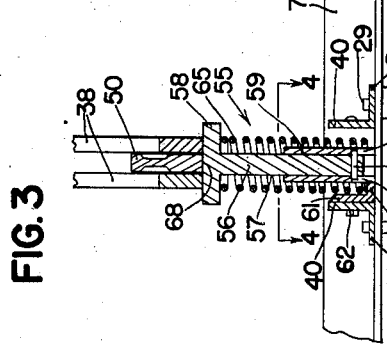
Figure 3 is a sectional elevational view taken along a line 3—3 in Figure 2, and drawn to an enlarged scale.
Figure 4:
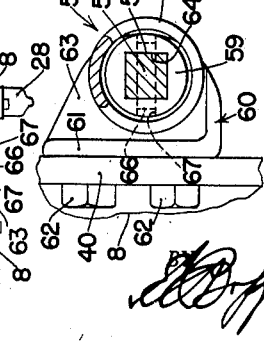
Figure 4 is an enlarged sectional plan view taken along a line 4—4 in Figure 3.

Referring now to the drawing, the frame of the dump rake is indicated generally by reference numeral 5 and comprises a pair of front and rear frame angles 6, 7, extending transversely and interconnected by a number of fore and aft extending frame angles 8 connected to the transverse angles by bolts 9. Only two of the frame members 8 are involved in connection with the present invention, although there are others which are not shown, in the interest of simplicity. The frame 5 is generally rectangular in form, extending transversely ahead of a rake head indicated generally by reference numeral 12. The frame 5 serves as a support for the operator's seat and is also connected to the draft animals or tractor by suitable draft connections (not shown).

The rake head 12 comprises a main transverse angle member 13 having a normally vertical flange 14 and a normally horizontal flange 15. A pair of bearings 16 are mounted at opposite ends of the angle beam 13 and the vertical flange 14 thereof and supports the beam 13 on a pair of laterally spaced wheels 17, one of which is shown in Figure 2 and comprises a hub portion 18 having radially outwardly extending spokes 19. The remainder of the wheel is broken away. A plurality of laterally spaced rake teeth 20 are secured to the horizontal flange 15 and extend rearwardly therefrom, curving downwardly to ground engageable ends (not shown).

The rake head is connected to the frame 5 by means of a plurality of brackets 25 in the nature of arms extending forwardly and downwardly from the vertical flange 14 of the beam 13. Only one of the supporting brackets is shown in the drawings. Each of the brackets 25 is hinged by means of a pivot bolt 26 to a cooperative bracket member 27, the forward end of which is provided with a supporting arm 28 lying under the rear transverse angle member 7 and rigidly secured by a bolt 29 to one of the fore and aft extending members 8. The bracket 27 also has a vertical flange 30 which is secured by a bolt 31 to the vertical flange of the frame member 7.

The rake head is swung in a counterclockwise direction as viewed in Figure 2, about the transverse axis of the wheel bearings 16, to raise the rake teeth 20 upwardly and forwardly from the normal position shown in the drawing, by means of suitable ratchet mechanism enclosed within the wheel hub 18 and actuated by means of a trip shaft 35 mounted on the rake head beam 13. This ratchet mechanism, which dumps the rake by power obtained from the wheels 17 during rotation of the latter, does not have any direct bearing upon the present invention, and the details are omitted from this description in the interest of simplicity, although this mechanism is disclosed in Patent 1,850,384, granted to Coultas, March 22, 1932. It is sufficient to say here, that the mechanism temporarily locks the rake head beam 13 to the wheel hub 18, whereupon the rake head and teeth rotate as a unit with the wheels 17 in a counterclockwise direction as viewed in Figure 2, and due to the connection between the rake head and the frame 5, by means of the forwardly and downwardly extending bracket arms 25, the frame 5 is swung rearwardly and downwardly relative to the axis of rotation of the wheels. Thus, it will be evident that the weight of an operator imposed upon the frame 5 will assist the upward swinging of the rake head, throughout the first portion of its movement, but will oppose the upward swinging as the rake head approaches its upward limit of movement.

The rake head is retained in raking position by means of a toggle holding device indicated generally by reference numeral 36, and comprising a pair of toggle links 37, 38 pivotally joined together by a bolt 39. The front toggle link 37 is connected at its forward end by means of a bolt 41 to the vertical flanges 40 of the fore and aft extending frame members 8, which are spaced apart to receive the link 37 therebetween. The rear link member 38 comprises a pair of laterally spaced bars which extend from the pivot bolt 39 rearwardly and are pivotally connected by a pivot bolt 42 to a bracket 43, which is rigidly mounted by bolts 44 on the normally horizontal flange 15 of the rake head beam 13. A block 45 is positioned between the frame members 8 beneath the front link member 37 and is secured to the frame members by a bolt 46. This block 45 acts as a stop against which the toggle links 37, 38 swing downwardly, the stop 45 serving to limit the movement of the links 37, 38 into substantially aligned position in which the rake teeth 20 are held in ground engaging raking position.

A holding lever 50 is pivotally mounted between the vertical flanges 40 of the fore and aft extending frame members 8 and is swingable in a vertical plane about a pivot bolt 51. The holding lever 50 is provided with a foot pedal 52 adapted to receive the foot of the operator, providing the latter with a means for holding the toggle links 37, 38 in aligned locking position during operation. The holding lever 50 extends upwardly between the bars of the rear link member 38, over the pivot bolt 39 between the two link members, and is adapted to bear upon the pivot bolt 39 to hold the link members 37, 38 in locking position.

The toggle links 37, 38 are urged out of locking position when the operator releases pressure from the holding lever 50, by means of a release device indicated in its entirety by reference numeral 55. The toggle release device 55 includes a T-shaped plunger 56 having a vertical shank portion 57 of square cross section and a transverse head portion 58 formed integrally with the shank 57. The shank 57 is slidably disposed in a vertical sleeve portion 59 of a bracket member 60. The bracket 60 comprises a vertical flange 61, which lies against the vertical flange 40 of one of the frame members 8 and is secured thereto by suitable bolts or studs 62. A horizontal supporting web portion 63 extends laterally from the flange portion 61 and carries the vertical sleeve portion 59, the latter being provided with a square opening 64 therethrough, which slidably receives the square shank 57 of the plunger 56, which is slidable vertically within the opening 64 but is prevented from twisting or rotating about the axis of the shank 57. A helical compression spring 65 embraces the sleeve portion 59 of the bracket 60 and also the shank 57 of the plunger 56 and bears against the lower side of the head 58 and reacts against the supporting web portion 63 of the bracket 60. Thus, the spring 65 urges the plunger 56 into engagement with the lower edges of the two bars of the link member 38 at a position near the pivot bolt 39, tending to swing the latter upwardly out of aligned locking position. A pin 66 extends through a transverse hole in the lower end of the shank 57 and the plunger 56 and projects on opposite sides of the shank into a pair of slots 67 in the lower end of the sleeve 59 to limit the upward movement of the plunger within the sleeve 59. The drawing shows the plunger at its upper limit of movement, which position it assumes when the operator's foot is removed from the pedal. The holding lever 50 has a cam 68 on the lower edge thereof, engaging the top of the cross head 58 of the plunger, so that the holding lever 50 as well as the toggle links 37, 38 are urged upwardly by the spring 65.

A hand lever 70 is secured by bolts 71 to the bracket 43, for the purpose of controlling the swinging movement of the rake head 12 by hand, when necessary, or to assist the wheels in raising the rake head.

During operation, the rake teeth 20 are normally disposed in ground engaging position, with the rake head in the position shown in the drawing. The teeth are firmly held in this position by the operator placing his foot on the pedal 52 of the holding lever 50 and pressing downwardly from the position shown in the drawing, forcing the cam 68 down upon the head 58 of the plunger, thereby compressing the spring 65. The holding lever 50 also engages the pivot bolt 39 to force the links 37, 38 into aligned locking position. When the operator desires to dump the rake, he releases his foot from the pedal 52, whereupon the spring 65 expands upwardly, forcing the head 58 of the plunger 56 against the lower edges of both the link bars 38 and the cam 68, raising the links out of locking position, thereby permitting the operator to swing the rake head and teeth upwardly either by hand by means of the lever 70 or by the ratchet mechanism within the wheel hub 18, in a manner well-known to those skilled in the art.

I claim:

1. For use in a dump rake comprising a wheel supported frame, a rake head pivoted thereto and provided with rake teeth, a toggle locking device comprising a pair of pivotally connected links connected between said rake head and said frame and movable downwardly from an angled position above said frame into aligned position above said frame for locking the head in raking position, and a holding lever mounted on said frame and engageable downwardly upon said toggle device to hold the latter in locked position, the combination of a generally vertically disposed sleeve mounted on said frame under said toggle device, a plunger telescopically disposed in said sleeve and having a head on its upper end adapted to bear against the lower side of one of said links, and a helical spring encircling said plunger and said sleeve for urging said plunger upwardly against the links to force the latter out of aligned locking position, said spring being resisted by pressure on said lever when holding said rake head in locked down position.

2. For use in a dump rake comprising a wheel supported frame, a rake head pivoted thereto and provided with rake teeth, a toggle locking device comprising a pair of pivotally connected links connected between said rake head and said frame and movable downwardly from an angled position above said frame into aligned position above said frame locking the head in raking position, and a holding lever mounted on said frame and engageable downwardly upon said toggle device to hold the latter in locked position, the combination of a generally vertically disposed sleeve mounted on said frame under said toggle device, said sleeve having a square aperture therein, a plunger having a square shank slidable vertically within said sleeve and having a cross head on its upper end engageable with the lower side of one of said links and said holding lever, and a helical spring encircling said plunger and stressed in compression to bias said plunger upwardly against said link and said lever to force said links upwardly out of said locking position, said spring being resisted by downward pressure on said lever when holding said rake head in locked down position.

3. For use in a dump rake comprising a wheel supported frame, a rake head pivoted thereto and provided with rake teeth, a toggle locking device comprising a pair of pivotally connected links connected between said rake head and said frame and movable downwardly from an angled position above said frame into aligned position above said frame for locking the head in raking position, one of said links comprising a pair of laterally spaced bars, and a holding lever mounted on said frame and extending upwardly between said bars to bear downwardly on said links to hold the latter down in aligned locking position, the combination of a generally vertically disposed sleeve mounted on said frame under said links, a T-shaped plunger telescopically disposed in said sleeve, said plunger having a cross head disposed under said pair of bars and said holding lever, and a helical spring encircling said sleeve and said plunger and stressed in compression to bias said plunger head upwardly against said bars and said lever to force said links upwardly out of said locking position, said spring being resisted by downward pressure on said lever when holding said rake head in locked down position.

NOLAN D. COLVIN.